(12) United States Patent
Dickson

(10) Patent No.: US 6,484,114 B1
(45) Date of Patent: Nov. 19, 2002

(54) METHOD FOR CALIBRATING A FREE-SPACE-COUPLED FIBER-OPTIC TRANSMISSION SYSTEM

(75) Inventor: William C. Dickson, San Mateo, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 0 days.

(21) Appl. No.: 09/935,427

(22) Filed: Aug. 20, 2001

(51) Int. Cl.[7] ............................................... G06F 19/00
(52) U.S. Cl. ........................................... 702/85; 385/28
(58) Field of Search ............................... 702/85; 385/28, 385/130; 324/601; 375/143; 219/121.69; 700/254, 259; 250/227.18; 359/204, 344; 356/615

(56) References Cited

U.S. PATENT DOCUMENTS

| | | | | |
|---|---|---|---|---|
| 4,932,989 A | * | 6/1990 | Presby | 219/121.69 |
| 5,410,625 A | * | 4/1995 | Jenkins et al. | 385/130 |
| 5,493,390 A | * | 2/1996 | Varasi et al. | 250/227.18 |
| 5,793,521 A | * | 8/1998 | O'Brien et al. | 359/344 |
| 5,838,882 A | * | 11/1998 | Gan et al. | 700/259 |
| 5,920,394 A | * | 7/1999 | Gelbart et al. | 356/615 |
| 6,070,109 A | * | 5/2000 | McGee et al. | 700/254 |
| 6,215,295 B1 | * | 4/2001 | Smith, III | 324/601 |
| 6,289,039 B1 | * | 9/2001 | Garodnick | 375/143 |
| 6,341,029 B1 | * | 1/2002 | Fillion et al. | 359/204 |

* cited by examiner

*Primary Examiner*—John S. Hilten
*Assistant Examiner*—Xiuqin Sun
(74) *Attorney, Agent, or Firm*—Townsend and Townsend and Crew (57) ABSTRACT

A method is provided for calibrating a free-space-coupled fiber-optic transmission system. The method uses signal content in the measured coupled power at frequencies equal to the sum, difference, and first harmonics of the frequencies of control-related dither signals to infer and correct errors in the kinematical model used to apply the dithers. The technique can operate independently or simultaneously with dither-based functions such as alignment control and power attenuation to provide continuous tracking of model terms. The calibration method does not require that any calibration-specific signals be injected into the system, or that the operation of primary functions be halted for the purpose of calibration.

14 Claims, 4 Drawing Sheets

METHOD FOR CALIBRATING A FREE-SPACE-COUPLED FIBER-OPTIC TRANSMISSION SYSTEM

BACKGROUND OF THE INVENTION

The invention relates to optical switching and free-space coupling of fiber optic waveguides in a single-mode fiber-optic transmission system, and specifically to calibrating the model terms of such systems. The invention finds application to micro-electromechanical systems (MEMS), but it is not so limited.

The technique of using open-loop oscillatory mirror commands (dithers) may be used in optical switching for: (1) detection of alignment errors through synchronous detection such as is described in a patent application of the present inventor entitled METHOD AND APPARATUS FOR OPTICAL BEAM ALIGNMENT DETECTION AND CONTROL (TTC Docket 20974-1.00), and for (2) intentional optical power attenuation through induced constant-power coupling loss such as is described in a patent application of the present inventor entitled METHOD AND APPARATUS FOR OPTICAL BEAM POWER ATTENUATION (TTC Docket 20974-8.00). In both examples, performance is limited by errors in the kinematics models that relate actuation commands to coupling loss. In the case of synchronous detection, modeling errors may create a cross-coupled closed-loop response that would necessitate reducing the servo bandwidths to achieve stable response. A A reduced bandwidth translates directly to an increased time required to nullify the alignment errors detected after the open-loop portion of a switch, which increases the overall switch time. In both of the detection and attenuation examples, modeling errors can cause undesirable signal content in the coupled power.

The kinematical relationship between mirror actuation commands and coupling loss is a strong function of the optical design (nominal path lengths, focal length, wavelength, and fiber properties) as well as unavoidable small errors in the component prescriptions and in the time-varying and temperature-dependent alignment of the optical components. The calibration values determined during an initial off-line calibration might provide acceptable performance for only a relatively short time after the calibration, after which the system might violate one or more performance specifications. If the system is required to operate longer than the time period of validity of the initial calibration, then the approach of using an initial off-line calibration is not acceptable. Taking a connection off-line for the purpose of calibration or injecting calibration-specific signals into the system may also be unacceptable options.

What is needed is a non-interference calibration technique designed to continuously detect and tune the parameters of a kinematical model used as part of a control system for a fiber-optic switch or similar optical system. This non-interference calibration technique must not require that any calibration-specific signals be injected into the system, or that the operation of primary functions such as alignment control and/or power attenuation be halted for the purpose of calibration.

SUMMARY OF THE INVENTION

According to the invention, a method is provided for calibrating a free-space-coupled fiber-optic transmission system. The method uses signal content in the measured coupled power at frequencies equal to the sum, difference, and first harmonics of the frequencies of control-related dither signals to infer and correct errors in the kinematical model used to apply the dithers. The technique can operate independently or simultaneously with dither-based functions such as alignment control and power attenuation to provide continuous tracking of model terms. The calibration method does not require that any calibration-specific signals be injected into the system, or that the operation of primary functions be halted for the purpose of calibration.

The invention is explained with respect to a structure with two beam-steering elements having four degrees of freedom. The invention is readily generalized to a single beam-steering element or to a larger number of beam-steering elements.

The invention will be better understood by reference to the following detailed description in connection with the accompanying embodiments.

DESCRIPTION OF SPECIFIC EMBODIMENTS

Free-Space Coupled Fiber Optic Switch Using MEMS

Figure 1:
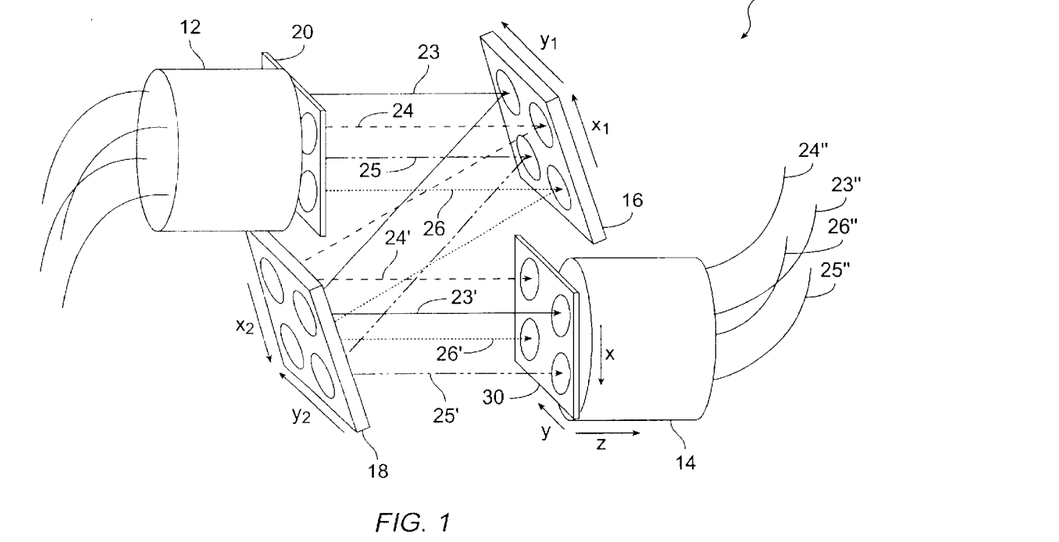
FIG. 1 is a block diagram of a four-port MEMS mirror array fiber optic switch in which the present invention may be implemented.

Referring to FIG. 1 there is shown an example of a four-port MEMS mirror array fiber-optic switch 10 in which the present invention may be implemented. The function of the fiber-optic switch 10 is to produce desired free-space couplings between the input fibers (in a first fiber array 12) and output fibers (in a second fiber array 14) via two-axis steering mirrors on a first mirror array 16 and a second mirror array 18. In the embodiment illustrating the invention, the optical path is unidirectional between input fibers and output fibers, although the invention is not so limited. Expanding laser beams emanating from the input fiber array 12 are substantially collimated using a first lens array 20 confronting the first fiber array 12. Mirrors on the first or input mirror array 16 steer the collimated beams 23–26 from the first lens array 20 toward the appropriate mirrors on the second or output mirror array 18. The mirrors on the output mirror array 18 steer their incident beams 23'–26' into the corresponding lenses on a second or output lens array 30. The output lenses of the second lens array 30 produce converging beams necessary for coupling power into the output fibers 23"–26" of the second fiber array 14.

Output Beam Alignment Geometry

Figure 2:
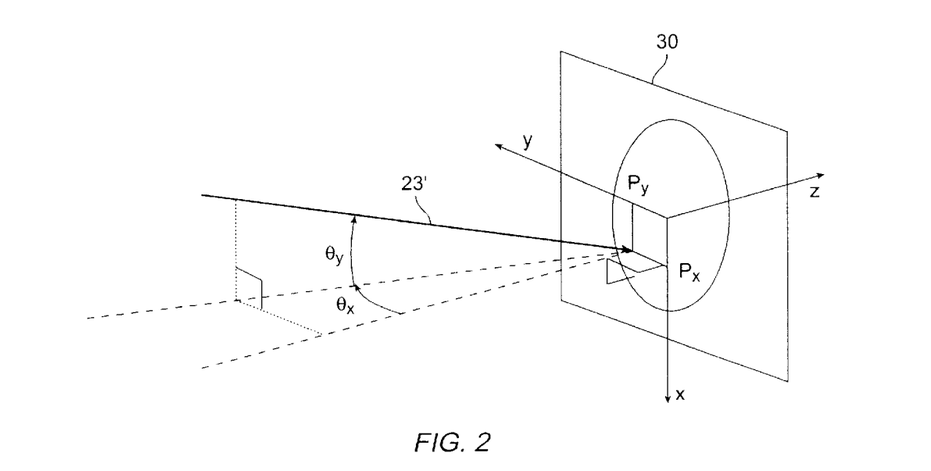
FIG. 2 is a diagram to illustrate beam alignment errors at the output lens as used in the present invention.

Referring to FIG. 2, there is shown a diagram defining the alignment of an output beam relative to its output lens/fiber port in accordance with the invention. This technique may be applied in a variety of geometries, only one of which is that of FIG. 1. The axes "x", "y", and "z" define an "output" frame. The axis z is defined as the optical axis of the particular lens/fiber port (which may vary across the array of lens/fiber ports), and the perpendicular axes x and y are in the plane perpendicular to z. The beam intersects the output x-y plane at the linear displacements $P_x$ and Py in x and y, respectively. The two angles $\theta_x$ and $\theta_y$ define the orientation of the beam in the output x-y-z frame. With $\theta_x$ and $\theta_y$ equal to zero, the beam is parallel to the z axis. $\theta_x$ and $\theta_y$ are the rotations of the beam in the x and y directions, respectively, where a small-angle approximation (valid for the purpose of analyzing optical coupling) eliminates the need to define the order of the rotations. To clarify the sense of the rotations, the small-angle approximation for the unit vector in the direction of the beam expressed in the output frame is given by:

$$u_{beam}{}^{out} = [\theta_y, -\theta_x, 1].$$

Gaussian Power Coupling

Assuming that longitudinal misalignments are zero and that the beam is matched to the mode field radius of the output fiber, the total coupled power $P_{out}$ (a scalar quantity measured at the output fiber) can be approximated in a Gaussian form in terms of an input power $P_{in}$ and four normalized beam alignment errors:

$$P_{out} = P_{in} e^{-(\alpha^2 + \beta^2 + \rho^2 \sigma^2)}, \quad (1)$$

where $P_{in}$ is the optical power before loss due to alignment errors, and the four normalized errors $\alpha$, $\beta$, $\rho$, and $\sigma$ are given by:

$$\alpha = \frac{f}{\omega_0} \theta_x, \ \beta = \frac{f}{\omega_0} \theta_y, \ \rho = \frac{n_{gap} \pi \omega_0}{\lambda f} (P_x - f\theta_y),$$

$$\text{and } \sigma = \frac{n_{gap} \pi \omega_0}{\lambda f} (P_y + f\theta_x),$$

where:
- f is the lens focal length,
- $w_0$ is the beam radius at $1/e^2$ power density,
- $\lambda$ is the laser wavelength, and
- $n_{gap}$ is the index of refraction of the medium in the lens/fiber gap.

Constant-Power Dithering

Figure 3:
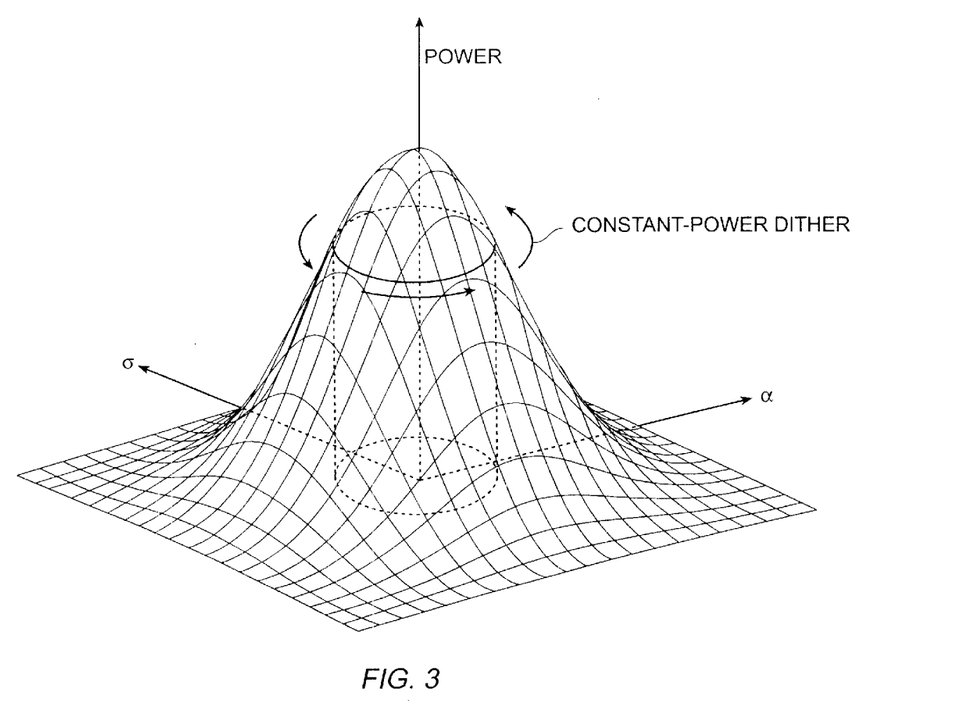
FIG. 3 is a three dimensional graph to illustrate constant-power dithering.

In the case of a MEMS fiber-optic switch for which the coupled power is Gaussian in the four normalized alignment errors, quadrature (sine and cosine signals at a given frequency) dithering of the beam alignments produces a constant coupled power when the alignment errors (ignoring the dither component) are zero and the model parameters of the system are properly tuned. FIG. 3 illustrates for two of the four axes the concept of using quadrature dithering to provide a constant output power when the coupled power is Gaussian in the two alignment errors shown. When the alignment errors (ignoring the dither component) are zero as in FIG. 3, the sine and cosine dithers at the given frequency, whether above or below the natural resonance of the device, produce a circular trajectory in the two alignment errors. Since the sum of the squares of these two alignment errors is constant (due to the sine and cosine dithering), the result, as dictated by Equation 1, is a constant attenuated coupled power even though the individual errors are changing. If the other two dithers are also in quadrature form, these dithers will contribute a second constant loss term, such that the overall attenuation level due to the four dithers is constant.

Kinematics Modeling

Dithering in the coupling space requires a model of the kinematical mapping between the mirror angles and the four coupling errors so that the mirrors can work in concert to produce the desired orthogonal beam motions at the output.

Specifically, the kinematical mapping between the four angular displacements of the two mirrors in an optical path and the four displacements in the coupling space is expressed as:

$$p = MQ\theta,$$

where p is defined as a vector of the four normalized beam alignment components:

$$p = [\alpha \sigma \beta \rho]^T,$$

and $\theta$ as a vector of the four mirror angles:

$$\theta = [x_{in} x_{out} y_{in} y_{out}]^T,$$

where $x_{in}$, $x_{out}$, $y_{in}$, and $y_{out}$ are the mirror rotations in the directions of $x_1$, $x_2$, $y_1$, and $y_2$, respectively, as shown in FIG. 1. The 4×4 axis-misalignment matrix Q expresses any misalignments between the four mirror angles with respect to the effect on motion of the beam at the output lens. The matrix Q maps the mirror angles $\theta$ to a set of coordinates u:

$$u = Q\theta,$$

where u is given by:

$$u = [v_1 v_2 w_1 w_2]^T.$$

By definition, the coordinates $v_1$, and $v_2$ are combinations of the mirror angles that map uniquely to variations in the two coupling coordinates $\alpha$ and $\sigma$, which produce motion of the output beam in a plane defined as $P_v$. The coordinates $w_1$ and $w_2$ map uniquely to variations in the two coupling coordinates $\beta$ and $\rho$, which produce motion of the output beam in a plane $P_w$ that is perpendicular to $P_v$. (Both $P_v$ and $P_w$ are parallel to the output optical axis.)

The misalignment matrix Q is assumed to have the form:

$$Q = \begin{bmatrix} I_2 & Q_A \\ Q_B & I_2 \end{bmatrix},$$

where $I_2$ is an identity matrix of dimension two, and the 2×2 coupling matrices $Q_A$ and $Q_B$ are ideally zero The matrix $Q_A$ defines the non-ideal coupling of $y_{in}$ and $y_{out}$ into $v_1$ and $v_2$, and the matrix $Q_B$ defines the non-ideal coupling of $x_{in}$ and $x_{out}$ into $w_1$ and $w_2$.

The 4×4 kinematics matrix M that maps the decoupled coordinates u to the beam alignments p as in:

$$p = Mu$$

is given by:

$$M = \begin{bmatrix} M_v & 0_{2\times 2} \\ 0_{2\times 2} & M_w \end{bmatrix}, \ M_v = \begin{bmatrix} M_{v11} & M_{v12} \\ M_{v21} & M_{v22} \end{bmatrix}, \ M_w = \begin{bmatrix} M_{w11} & M_{w12} \\ M_{w21} & M_{w22} \end{bmatrix},$$

where the scalar terms $M_{vij}$ and $M_{wij}$ are predicted analytically as:

$M_{v11} = 2A \cos(\phi);$
$M_{v21} = -2B \cos(\phi)(h_2 + h_3)/f - 1);$
$M_{v12} = 2A \cos(\phi);$
$M_{v22} = -2B \cos(\phi)(h_3/f - 1);$
$M_{w11} = -2A;$
$M_{w21} = -2B(h_2 + h_3)/f - 1);$
$M_{w12} = 2A;$
$M_{w22} = 2B(h_3/f - 1);$ where
- $A = f/w_0;$
- $B = n_{gap} \pi w_0 / \lambda;$ where f=lens focal length;

λ=laser wavelength;

$w_0$=beam radius at $1/e^2$ power density;

$n_{gap}$=index of refraction of the medium in the gap between the lens and fiber;

φ=y-angle rotation of mirror arrays from perpendicular to lens/fiber optical axes;

$h_2$=path distance between mirrors in a given connection; and $h_3$=path distance between the output mirror and output lens in a given connection.

The matrices M and Q together define the overall mapping from mirror angles θ to the coupling variables p, as repeated here:

$$p=MQ\theta.$$

The inverse reflection kinematics matrix N is defined as the inverse of M:

$$N=M^{-1},$$

such that the mirror joint angles θ can be computed from the vector of reference output variables $p_{ref}$ and model terms $Q_{mod}$ and $N_{mod}$:

$$\theta=Q^{-1}_{mod}N_{mod}p_{ref}$$

where the terms $p_{ref}$, $Q^{-1}_{mod}$, and $N_{mod}$ are given by:

$$p_{ref}=[\alpha_{ref}\sigma_{ref}\beta_{ref}\rho_{ref}]^T, Q_{mod}=\begin{bmatrix} I_2 & Q_{Amod} \\ Q_{Bmod} & I_2 \end{bmatrix},$$

$$\text{and } N_{mod}=M^{-1}_{mod}=\begin{bmatrix} N_{vm} & 0_{2\times 2} \\ 0_{2\times 2} & N_{wm} \end{bmatrix},$$

where $N_{vm}$ and $N_{wm}$ are composed of eight scalar quantities $N_{vmij}$ and $N_{wmij}$ (i,j=1:2):

$$N_{vm}=\begin{bmatrix} N_{vm11} & N_{vm12} \\ N_{vm21} & N_{vm22} \end{bmatrix}, \text{and } N_{wm}=\begin{bmatrix} N_{wm11} & N_{wm12} \\ N_{wm21} & N_{wm22} \end{bmatrix}.$$

Coupled Power as a Function of Actual and Model Terms

The model of the kinematics matrix $M_{mod}$ is given by:

$$M_{mod}=\begin{bmatrix} M_{vmod} & 0_{2\times 2} \\ 0_{2\times 2} & M_{wmod} \end{bmatrix},$$

where the sub-matrices $M_{vmod}$ and $M_{wmod}$ are defined in terms of eight scalar quantities:

$$M_{vmod}=\begin{bmatrix} M_{vm11} & M_{vm12} \\ M_{vm21} & M_{vm22} \end{bmatrix} M_{wmod}=\begin{bmatrix} M_{wm11} & M_{wm12} \\ M_{wm21} & M_{wm22} \end{bmatrix},$$

and the misalignment model $Q_{mod}$, following the form of Q, is defined as:

$$Q_{mod}=\begin{bmatrix} I_2 & Q_{Amod} \\ Q_{Bmod} & I_2 \end{bmatrix}.$$

The terms $Q_{Amod}$ and $Q_{Bmod}$ are defined in terms of four axis-misalignment parameters $\delta_{mod1}$, $\delta_{mod2}$, $\delta_{mod3}$, and $\delta_{mod4}$ as:

$$Q_{Amod}=\begin{bmatrix} \delta_{mod1} & 0 \\ 0 & \delta_{mod2} \end{bmatrix}, \text{and } Q_{Amod}=\begin{bmatrix} 0 & \delta_{mod3} \\ \delta_{mod4} & 0 \end{bmatrix}.$$

Other definitions of $Q_{mod}$ using alternate placements of $\delta_{modk}$ (k=1,2,3,4) are possible but would require further analysis to verify functionality.

Combining the forward kinematics equation p=MQθ and the inverse kinematics equation for θ produces a relationship between the actual and reference dither states:

$$p=MQQ^{-1}_{mod}N_{mod}p_{ref}$$

Since the coupled output power (ignoring alignment errors) is given by:

$$P_{out}=P_{in}e^{-|p|^2},$$

the log term $-\log(P_{out})$ is equal to:

$$-\log(P_{out})=|p|^2-\log(P_{in}),$$

where $|p|^2$, which can be formed as $p^Tp$, is given by:

$$|p|^2=p^Tp=p^T_{ref}N^T_{mod}Q^{-T}_{mod}Q^TM^TMQQ^{-1}_{mod}N_{mod}p_{ref}.$$

The equation for $|p|^2$ can be used to derive the sensitivity of $-\log(P_{out})$ to modeling errors in $Q_{mod}$ and $M_{mod}$, providing methods to detect and reduce the modeling errors, which will be discussed next.

Detection of Axis Misalignments and Coupling Matrix Errors

According to the invention, the approach presented here for the detection of axis misalignments and coupling-matrix errors is based on linearizing the equation for $|p|^2$ with respect to errors in model parameters. The relevant error matrices $Q_{err}$ and $M_{err}$ are defined as the differences between the model and actual terms:

$$Q_{err}=Q_{mod}-Q$$

and $$M_{err}=M_{mod}-M.$$

The linearized form of the equation for $|p|^2$ applicable to the general case of one or more steering elements can be expressed as a function of model and error terms:

$$|p|^2_{lin}=p^T_{ref}p_{ref}+-p^T_{ref}(M_{mod}Q_{err}N_{mod}+N^T_{mod}Q_{err}M^T_{mod})p_{ref}+-p^T_{ref}(M_{err}N_{mod}+N^T_{mod}M^T_{err})p_{ref}.$$

For the case of an optical switch or similar beam-steering mechanism employing two beam-steering elements, the terms $Q_{err}$ and $M_{err}$ are 4×4 matrices having the block forms consistent with the assumed forms of Q and M:

$$Q_{err}=\begin{bmatrix} 0_{2\times 2} & Q_{Aerr} \\ Q_{Berr} & 0_{2\times 2} \end{bmatrix}, \text{and } M_{err}=\begin{bmatrix} M_{verr} & 0_{2\times 2} \\ 0_{2\times 2} & M_{werr} \end{bmatrix}.$$

Defining $p_{vref}$ and $p_{wref}$ as sub-vectors of $p_{ref}$:

$$p_{vref}=[\alpha_{ref}\sigma_{ref}]^T,$$

and $$p_{wref}=[\beta_{ref}\rho_{ref}]^T,$$

the linearized form of $|p|^2$ can be expressed in terms of the 2×2 model and error matrices:

$$|p|^2{}_{lin}=p^T{}_{vref}p_{vref}+p^T{}_{wref}p_{wref}-2p^T{}_{vref}(M_{vmod}Q_{Aerr}N_{wmod}+N^T{}_{vmod}Q^T{}_{Berr}M^T{}_{wmod})p_{wref}-2p^T{}_{vref}M_{verr}N_{vmod}p_{vref}-2p^T{}_{wref}M_{werr}N_{wmod}p_{wref}.$$

Defining the four errors in the misalignment model as:

$$\epsilon_k = \delta_{modk} - \delta_k \, (k=1,2,3,4),$$

the error matrices $Q_{Aerr}$ and $Q_{Berr}$, consistent with the assumed forms of $Q_{Amod}$ and $Q_{Bmod}$, are given by:

$$Q_{Aerr} = \begin{bmatrix} \epsilon_1 & 0 \\ 0 & \epsilon_2 \end{bmatrix}, \text{ and } Q_{Berr} = \begin{bmatrix} 0 & \epsilon_3 \\ \epsilon_4 & 0 \end{bmatrix}.$$

The 2×2 coupling-matrix errors are expressed as:

$$M_{verr} = \begin{bmatrix} \epsilon_5 & \epsilon_7 \\ \epsilon_6 & \epsilon_8 \end{bmatrix} \text{ and } M_{werr} = \begin{bmatrix} \epsilon_9 & \epsilon_{11} \\ \epsilon_{10} & \epsilon_{12} \end{bmatrix}.$$

Assuming constant-power dithering (using sine and cosine signals at two frequencies for the four reference signals $\alpha_{ref}$, $\beta_{ref}$, $\rho_{ref}$, and $\rho_{ref}$), and using the above definitions of the error terms, the coupled-power term $|p|^2{}_{lin}$ can be written as a function of the dither references $p_{vref}$ and $p_{wref}$ and a linear combination of twelve unbiased mode functions $G_k$ (k=1,2, ..., 12) and twelve bias terms $B_k$ (k=1,2, ..., 12) scaled by the corresponding error terms:

$$|p|^2_{lin} = p^T_{vref} p_{vref} + p^T_{wref} p_{wref} + \sum_{i=1}^{12} G_i \epsilon_i + \sum_{i=1}^{12} B_i \epsilon_i,$$

where the twelve unbiased mode functions $G_k$ (k=1,2, ..., 12) are given by:

$G_1 = -2(\alpha_{ref} M_{vm11} + \sigma_{ref} M_{vm21})(\beta_{ref} N_{wm11} + \rho_{ref} N_{wm12})$ $G_2 = -2(\alpha_{ref} M_{vm12} + \sigma_{ref} M_{vm22})(\beta_{ref} N_{wm21} + \rho_{ref} N_{wm22})$ $G_3 = -2(\alpha_{ref} N_{vm11} + \sigma_{ref} N_{vm12})(\beta_{ref} M_{wm12} + \rho_{ref} M_{wm22})$ $G_4 = -2(\alpha_{ref} N_{vm21} + \sigma_{ref} N_{vm22})(\beta_{ref} M_{wm11} + \rho_{ref} M_{wm21})$ $G_5 = -2(\alpha^2_{ref} N_{vm11} + \alpha_{ref}\sigma_{ref} N_{vm12}) + N_{vm11}$ $G_6 = -2(\alpha_{ref}\sigma_{ref} N_{vm11} + \sigma^2_{ref} N_{vm12}) + N_{vm12}$ $G_7 = -2(\alpha^2_{ref} N_{vm21} + \alpha_{ref}\sigma_{ref} N_{vm22}) + N_{vm21}$ $G_8 = -2(\alpha_{ref}\sigma_{ref} N_{vm21} + \sigma^2_{ref} N_{vm22}) + N_{vm22}$ $G_9 = -2(\beta^2_{ref} N_{wm11} + \beta_{ref}\rho_{ref} N_{wm12}) + N_{wm11}$ $G_{10} = -2(\beta_{ref}\rho_{ref} N_{wm11} + \rho^2_{ref} N_{wm12}) + N_{wm12}$ $G_{11} = -2(\beta^2_{ref} N_{wm21} + \beta_{ref}\rho_{ref} N_{wm22}) + N_{wm21}$ $G_{12} = -2(\beta_{ref}\rho_{ref} N_{wm21} + \rho^2_{ref} N_{wm22}) + N_{wm22}$ and the twelve bias functions $B_k$ (k=1,2, ..., 12) are given by:

$B_1 = 0$ $B_2 = 0$ $B_3 = 0$ $B_4 = 0$ $B_5 = -N_{vm11}$ $B_6 = -N_{vm12}$ $B_7 = -N_{vm21}$ $B_8 = -N_{vm22}$ $B_9 = -N_{wm11}$ $B_{10} = -N_{wm12}$ $B_{11} = -N_{wm21}$ $B_{12} = -N_{wm22}$

The mode functions $G_k$ (k=1,2, ..., 12) and bias functions $B_k$ (k=1,2, ..., 12) represent the AC and DC sensitivities, respectively, of $|p|^2_{lin}$ to the twelve errors $\epsilon_k$ (k=1,2, ..., 12). However, while the first four mode functions $G_1$–$G_4$ (associated with axis misalignments) are orthogonal, the structure of $G_5$–$G_{12}$ (associated with terms of $M_{verr}$) results in two of the four mode functions $G_5$–$G_8$ being linear combinations of the other two, and two of the four mode functions $G_9$–$G_{12}$ (associated with terms of $M_{werr}$) being linear combinations of the other two. Thus, only eight linear combinations of the twelve errors $\epsilon_k$ (k=1,2, ..., 12) are observable in $|p|^2_{lin}$. As a result, a choice must be made as to which two combinations of $\epsilon_5$–$\epsilon_8$ and which two combinations of $\epsilon_9$–$\epsilon_{12}$ are to be considered observable in $|p|^2_{lin}$.

For the purpose of simplifying this discussion, $\epsilon_5$ and $\epsilon_6$ will be considered the two observable combinations of $\epsilon_5$–$\epsilon_8$, and $\epsilon_9$ and $\epsilon_{10}$ will be considered the two observable combinations of $\epsilon_9$–$\epsilon_{12}$. Other choices for observable quantities using combinations of all four respective $\epsilon_k$ are possible, and some choices might be advantageous or convenient, depending on the system under consideration. The specific choice does not alter the general approach for detecting the observable combinations of $\epsilon_k$, which will now be discussed.

The eight error terms $\epsilon_k$ (k=1–6,9–10) represent the correlation between $|p|^2_{lin}$ and the respective mode function $G_k$ (k=1–6,9–10). As such, the errors $\epsilon_k$ (k=1–6,9–10) can be detected as the correlation between $|p|^2_{lin}$ and the respective mode functions $G_k$ (k=1–6, 9–10).

According to the invention, the correlation approach presented here for finding $\epsilon_k$ (k=1–6,9–10) is to use a moving average filter operating on the product of the mode functions $G_k$ and the negative of the logarithm of the power:

$$\epsilon_k = \text{MoveAvgFilt}(-\log(P_{out})G_k)(k=1-6,9-10).$$

The moving average filter averages $-\log(P_{out})G_k$ over a time period $T_{avg}$, where $T_{avg}$ is chosen to be equal to the period over which the mode functions $G_k$ (k=1–6,9–10) complete one cycle of relative phasing. Such a filter preserves the low-frequency band of its input signal, while squelching signals at the averaging frequency $f_{avg}=1/T_{avg}$ and its harmonics. Filtering $-\log(P_{out})G_k$ with this filter thus extracts the detected error $\epsilon_k$ while squelching residual signal content at $f_{avg}$ and its harmonics.

As an example, the two dither frequencies $f_1$ and $f_2$ are given by:

$$f_1 = 2f_{avg},$$

and $$f_2 = 3f_{avg}.$$

and the four dither references are given by sine and cosine signals at the two frequencies:

$\alpha_{ref}=\sin(2\pi f_1 t)$, $\sigma_{ref}=\cos(2\pi f_{1i} t)$, $\beta_{ref}=\sin(2\pi f_2 t)$, and $\rho_{ref}=\cos(2\pi f_2 t)$.

Observation of $G_k$ (k=1–12) indicates that the mode functions $G_k$ (k=1–4) contain only cross-frequency terms resulting in signal content at $f_2-f_1$ and $f_2+f_1$, while functions $G_k$ (k=5–12) contains signal content at $2f_1$ and $2f_2$. The averaging period $T_{avg}$ over which the mode functions repeat one cycle of relative phasing is given by $1/f_{avg}$, in which time the signals at the six frequencies $f_2-f_1$, $f_1$, $f_2$, $2f_1$, $f_2+f_1$, and $2f_2$ repeat 1, 2, 3, 4, 5, and 6 times, respectively.

As a note, the DC-dependence terms $B_k$ provide no information for detecting $\epsilon_k$, since individual DC contributions to $\log(P_{out})$ from multiple $\epsilon_k$ values cannot be differentiated. Also, the DC contributions have no detrimental effect on the correlation detection between $-\log(P_{out})$ and $G_k$, since correlation with $G_k$ ignores the DC component in $-\log(P_{out})$ due to the unbiased nature of $G_k$.

According to the invention, the eight detected error terms $\epsilon_k$ (k=1–6, 9–10) are used to update the four model terms $\delta_{modk}$ (k=1, 2, 3, 4) and the four observable components of $M_{vmod}$ and $M_{wmod}$ as follows. The detected errors $\epsilon_k$ are a measure of the modeling errors in the system at the time of the detection, so the eight elements $\epsilon_k$ (k=1–6, 9–10) diminish to zero when the model terms are at the correct static values. Numerically integrating the eight instantaneous estimates $\epsilon_k$ (k=1–6, 9–10) yields smoothed correction terms $\lambda_k$:

$$\lambda_k = \int K\epsilon_k dt$$

The correction terms $\lambda_k$ (k=1–6, 9–10) can be subtracted from the values of the eight initial estimates to form the eight model terms. The convergence rate of the eight model terms is set by the integral gain K used to incrementally add $\epsilon_k$ (k=1–6, 9–10) to the existing correction terms $\lambda_k$ (k=1–6, 9–10). An excessive gain value K will yield unstable response. Assuming the use of a reasonable gain, the model terms converge to steady-state values as the use of the model terms successfully minimizes the signal content in $-\log(P_{out})$ correlated to the eight independent mode functions $G_k$ (k=1–6, 9–10).

Since only two combinations of the four model errors between $M_v$ and $M_{vmod}$ and two combinations of the four model errors between $M_w$ and $M_{wmod}$ are observable, the steady-state values of $M_{vmod}$ and $M_{wmod}$ will not in general be equal to $M_v$ and $M_w$, respectively. As a result, the model matrices $M_{vmod}$ and $M_{wmod}$ will not represent the intended mapping between the mirror angles $\theta=[x_{in}x_{out}y_{in}y_{out}]^T$ (assuming no misalignments) and the output coordinates $p=[\alpha\sigma\beta\rho]^T$. However, the steady-state values of $M_{vmod}$ and $M_{wmod}$ will provide a mapping between the mirror angles and orthogonal combinations of $\alpha$, $\sigma$, $\beta$, and, $\rho$, which is sufficient for use with controllers governing alignment or attenuation. After an initial calibration phase, rows of $M_{vmod}$ and $M_{wmod}$ can be scaled up or down to normalize the amplitude of the AC power drop resulting from the application of individual dither references $p_{ref}$.

System with Calibration

Figure 4:
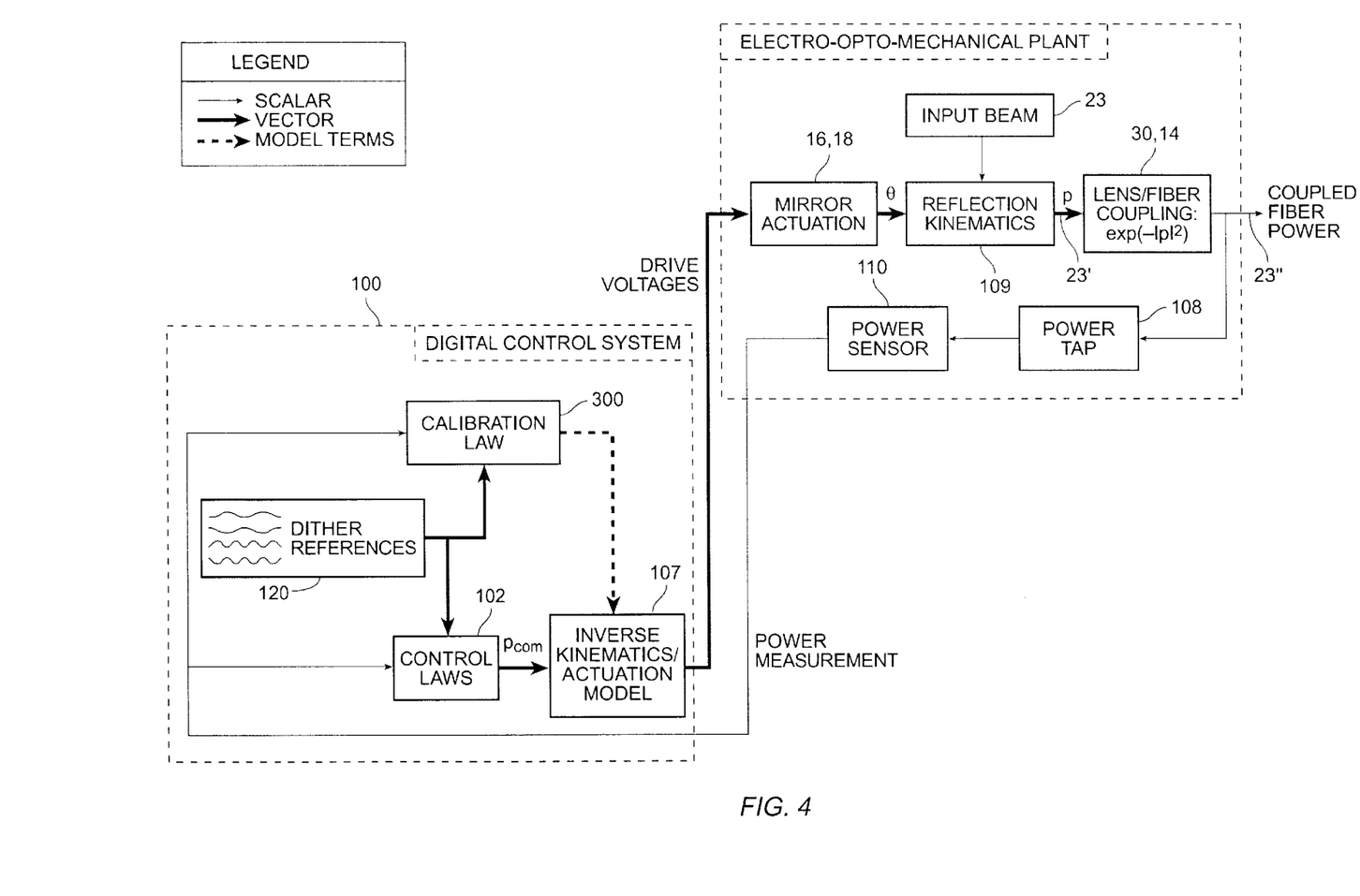
FIG. 4 is a schematic diagram to illustrate the integration of the calibration technique into a control system according to the invention.

FIG. 4 is a schematic diagram of a control system 100 with calibration according to the invention illustrated in interaction with elements of a fiber optic switch of FIG. 1. The control system 100 supplies the actuation voltages for a pair of MEMS mirrors on mirror arrays 16 and 18 of an electro-opto-mechanical plant. The MEMS mirrors produce the four mirror angles as a function of the actuation voltages. Reflection kinematics 109 specific to the optical design define the mapping of the four mirror angles to the four beam alignment errors at the output lens of lens array 30 (as shown in FIG. 2). As defined in Equation 1, the coupling of power into the output fiber of output fiber array 14 is Gaussian in the four beam alignment errors. FIG. 4 schematically illustrates the transformation shown in FIG. 1 in which beam 23 is steered by mirrors 16 and 18 to yield beam 23' incident at a lens in the output lens array 30. FIG. 4 also illustrates coupling of incident beam 23' through the lens into the associated fiber 23" of the output fiber array 14. A power tap 108 at the optical output supplies the feedback signal, which is converted to an electrical signal by a photodetector 110.

Within the control system 100, the feedback power signal is supplied to a calibration law unit 300 and to a control law unit 102. Similarly, the dither references 120 are provided to the calibration law unit 300 and the control law unit 102. The control law unit 102 produces a set of feedback control signals $p_{com}$, which is a vector of commanded values of the output-space components $\alpha$, $\beta$, $\rho$, and $\sigma$. The inverse kinematics and actuation model 107 converts the output-space commands into actuator drive voltages, which, upon application to the plant, are intended to produce output-space errors p that track the commands $p_{com}$. According to the invention, the calibration law unit 300 modifies parameters of the inverse kinematics/actuation model 107.

Figure 5:
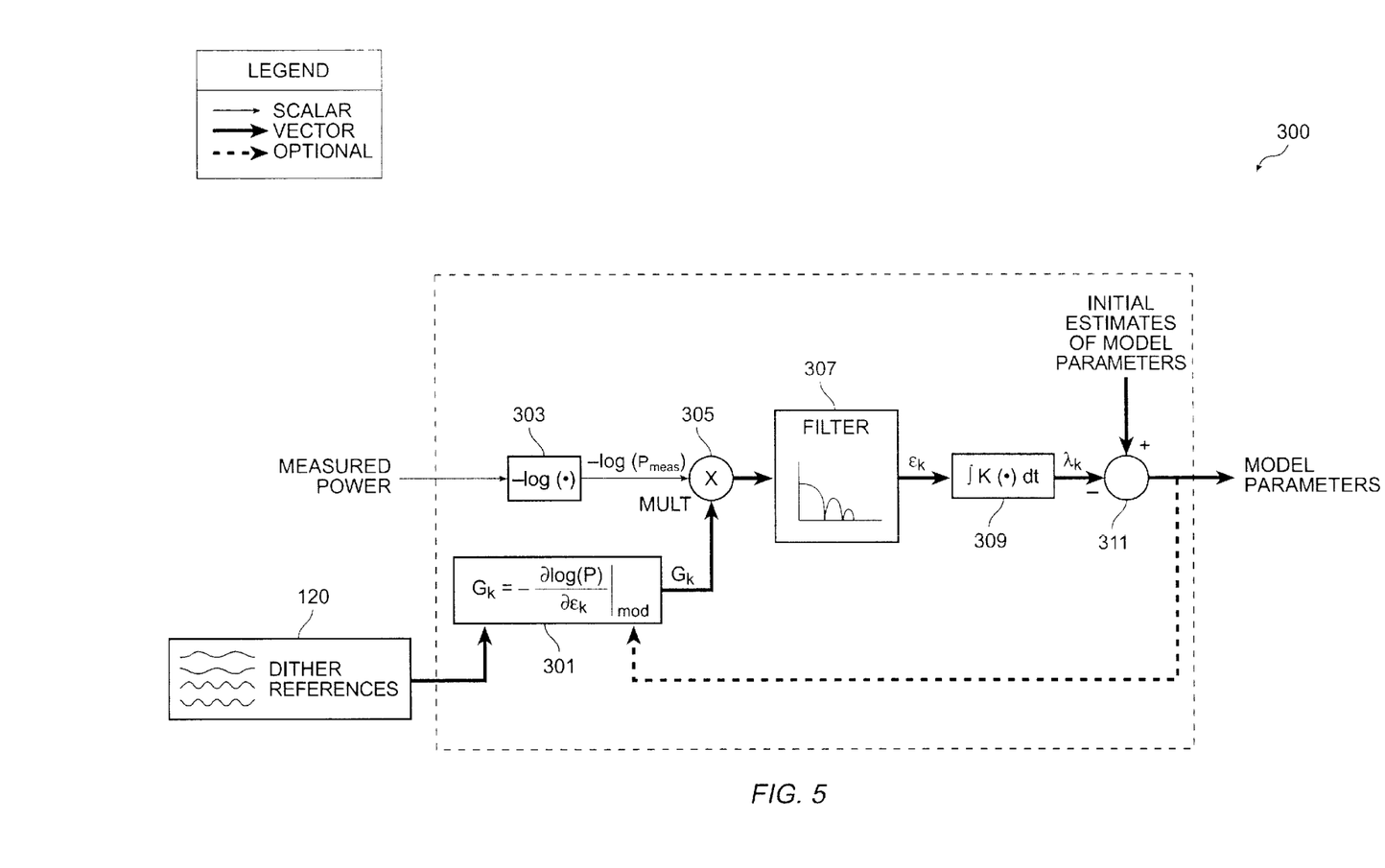
FIG. 5 is a schematic diagram to illustrate the function of the calibration law.

Referring to FIG. 5, there is shown a detail of the calibration law unit 300 referenced in FIG. 4. According to the invention, the calibration law unit 300 is provided with the dither references 120 and the measured power, and produces the parameters used in the inverse kinematics/actuation model 107 referenced in FIG. 4. The mode function generator 301 forms the eight mode functions $G_k$ (k=1–6, 9–10) (the analytical sensitivities of the log of the coupled power to modeling error $\epsilon_k$) using products of the dither references scaled by a set of model parameters, which can be updated (optionally) using the modified model parameters. The mode functions $G_k$ are multiplied at the multiplier 305 by the negative of the log of the measured power supplied by log function 303. The moving average filter 307 filters the output of the multiplier to pass the low-frequency components while squelching signal content at frequencies equal to the dither frequencies, the sum and difference of the dither frequencies, and harmonics of the dither frequencies. The signals $\epsilon_k$ (k=1–6, 9–10) passed by the filter 307 are the instantaneous estimates of the errors in the model parameters. The integrator block 309 integrates these error estimates to produce smoothed corrections to the model parameters, $\lambda_k$ (k=1–6, 9–10), which are subtracted from the initial parameter estimates at summer junction 311 to produce the parameters used in the inverse kinematics/actuation model 107 as shown in FIG. 4.

Novel Features

The calibration technique detects modeling errors through the observation of undesirable signal content in the coupled power at frequencies equal to the sum, difference, and harmonics of the dithers injected for the purpose of primary functions such as alignment detection and power attenuation. Thus, the technique does not require that any calibration-specific signals be injected into the system, or that the operation of primary functions be halted for the purpose of calibration. The calibration function can track model terms during operation to ensure continuous optimal performance. The technique can run independently as well, requiring only the presence of the dithers.

Alternate Implementations

The invention has been explained with reference to specific embodiments. Other embodiments will be evident to those of ordinary skill in the art. For instance, the estimation of model terms can be implemented in batch mode rather than continuously as described. Also, whereas the coupling model and associated derivatives were derived for the case of an analytical model, the model and its derivatives may also be formed using a numerical approach using experimental or simulated data. The approach used to estimate modeling errors was presented for the case of constant-power dithering using sine and cosine excitation at two frequencies, and for a system with a pair of beam-steering elements having four degrees of freedom, but the approach is not limited to this case. The equations may be readily generalized for systems using other forms of dithering and employing one or more beam-steering elements. It is therefore not intended that this invention be limited, except as indicated by the appended claims.

What is claimed is:

1. In an optical system employing dithering based on dither references for use in control of a beam-steering mechanism that controls beam direction and location and which provides as output an optical signal, the optical signal yielding a measure of coupled power, a method for continuously calibrating parameters of a kinematics model of the beam-steering mechanism during operation of the beam-steering mechanism, the method comprising:

detecting said measured coupled power;

processing said measured coupled power according to a coupled power function to obtain a measured coupled power function;

providing a set of mode functions describing the time histories of the partial derivatives of said coupled power function with respect to errors in model parameters;

detecting multiplicative scale factors describing amplitude of said mode functions present in said measured coupled power function as a set of inferred errors in model parameters equal to said detected multiplicative scale factors; and altering said model parameters in said kinematics model using said inferred errors.

2. The method according to claim 1 further including:

updating said mode functions using altered model parameters.

3. The method according to claim 1 wherein said mode functions are formed by:

assuming an initial model expressing said function of coupled power as a function of said model parameters, errors in the model parameters, and said dither references; and forming the partial derivatives of said initial model with respect to said errors in said model parameters, wherein said set of mode functions is equal to the time histories of numerical values of said partial derivatives.

4. The method according to claim 3 wherein form of said initial model and form of said partial derivatives of said initial model are analytical.

5. The method according to claim 3 wherein form of said initial model and form of said partial derivatives of said initial model are numerical.

6. The method according to claim 4 wherein said coupled power function is a logarithm.

7. The method according to claim 1 wherein said detection of multiplicative scale factors comprises:

forming product signals equal to the time histories of the multiplicative product of said function of measured power and said mode functions; and filtering said product signals using a low-pass filter.

8. The method according to claim 7 wherein said low-pass filter is a moving-average filter which averages said product signals over one time period associated with said dithering to yield said multiplicative scale factors.

9. The method according to claim 1 wherein said altering of model parameters comprises:

introducing a set of initial estimates of model parameters;

forming the numerical integral of said inferred model errors using a bandwidth-fixing integral gain; and combining said numerical integral with said initial estimates to yield current estimates of model parameters.

10. In an optical system employing dithering based on dither references for use in control of a beam-steering mechanism that controls beam direction and location and which provides as output an optical signal, the optical signal yielding a measure of coupled power, a method for continuously calibrating parameters of a kinematics model of the beam-steering mechanism during operation of the beam-steering mechanism, the method comprising:

detecting said measured coupled power;

processing said measured coupled power according to a coupled power function to obtain a measured coupled power function;

providing a set of mode functions describing the time histories of the partial derivatives of said coupled power function with respect to errors in model parameters, wherein said mode functions are formed by:

assuming an initial model expressing said function of coupled power as a function of said model parameters, errors in the model parameters, and said dither references; and forming the partial derivatives of said initial model with respect to said errors in said model parameters, wherein said set of mode functions is equal to the time histories of numerical values of said partial derivatives;

detecting multiplicative scale factors describing amplitude of said mode functions present in said measured coupled power function as a set of inferred errors in model parameters equal to said detected multiplicative scale factors, wherein said detection of multiplicative scale factors comprises:

forming product signals equal to the time histories of the multiplicative product of said function of measured power and said mode functions; and filtering said product signals using a low-pass filter;

altering said model parameters in said kinematics model using said inferred errors, wherein said altering of model parameters comprises:

introducing a set of initial estimates of model parameters;

forming the numerical integral of said inferred model errors using a bandwidth-fixing integral gain; and combining said numerical integral with said initial estimates to yield current estimates of model parameters; and updating said mode functions using said altered model parameters.

11. The method according to claim 10 wherein form of said initial model and form of said partial derivatives of said initial model are analytical.

12. The method according to claim 10 wherein form of said initial model and form of said partial derivatives of said initial model are numerical.

13. The method according to claim 11 wherein said coupled power function is a logarithm.

14. The method according to claim 10 wherein said low-pass filter is a moving-average filter which averages said product signals over one time period associated with said dithering to yield said multiplicative scale factors.

* * * * *